(12) United States Patent
Fujita et al.

(10) Patent No.: US 9,242,745 B2
(45) Date of Patent: Jan. 26, 2016

(54) ORBIT ATTITUDE CONTROL DEVICE, AND METHOD OF CONTROLLING ORBIT ATTITUDE

(71) Applicant: MITSUBISHI HEAVY INDUSTRIES, LTD., Tokyo (JP)

(72) Inventors: Toshiharu Fujita, Tokyo (JP); Nobuaki Hayakawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/018,667

(22) Filed: Sep. 5, 2013

(65) Prior Publication Data

US 2014/0145036 A1  May 29, 2014

(30) Foreign Application Priority Data

Nov. 28, 2012 (JP) ................... 2012-260142

(51) Int. Cl.
- *B64G 1/26* (2006.01)
- *B64G 1/36* (2006.01)
- *F02K 9/86* (2006.01)

(52) U.S. Cl.
CPC .. *B64G 1/26* (2013.01); *B64G 1/36* (2013.01); *F02K 9/86* (2013.01)

(58) Field of Classification Search
CPC .......... B64G 1/24; B64G 1/242; B64G 1/245; B64G 1/26; B64G 1/36; G05D 1/0883
USPC .............. 244/52, 158.5, 158.6, 158.8, 171
See application file for complete search history.

(56) References Cited

U.S. PATENT DOCUMENTS

| | | | | |
|---|---|---|---|---|
| 4,550,888 | A | * | 11/1985 | Douglass et al. ............ 244/3.22 |
| 4,585,191 | A | | 4/1986 | Blount |
| 4,786,019 | A | | 11/1988 | Uken |
| 4,787,579 | A | | 11/1988 | Smith |
| 4,802,333 | A | | 2/1989 | Smith |
| 4,923,152 | A | * | 5/1990 | Barkats ...................... 244/171.1 |
| 5,456,425 | A | | 10/1995 | Morris et al. |
| 5,456,429 | A | * | 10/1995 | Mayersak .................... 244/76 J |

(Continued)

OTHER PUBLICATIONS

U.S. Patent Office Action issued Apr. 16, 2015 in related U.S. Appl. No. 14/018,698.

(Continued)

*Primary Examiner* — Tien Dinh
*Assistant Examiner* — Christopher Hutchens
(74) *Attorney, Agent, or Firm* — Wenderoth, Lind & Ponack, L.L.P.

(57) ABSTRACT

An orbit attitude control device includes a divert thruster including a plurality of nozzles. First group nozzles inject combustion gas in opposite directions along a first axis. Second group nozzles inject combustion gas in opposite directions along a second axis. A control section calculates correction values for opening degree commands based on a detection value of a pressure of the combustion chamber and a command value of the pressure, and corrects the opening degree command values by the correction values. The device further includes a first axis acceleration sensor for detecting acceleration along the first axis and a second axis acceleration sensor for detecting acceleration along the second axis. The correction values for the opening degrees of the first group nozzles are determined by a first axis acceleration, and the correction values for the opening degrees of the second group nozzles are determined by a second axis acceleration.

10 Claims, 9 Drawing Sheets

(56) References Cited

U.S. PATENT DOCUMENTS

| | | | |
|---|---|---|---|
| 6,062,512 A * | 5/2000 | Wang et al. | 244/170 |
| 6,315,239 B1 | 11/2001 | Voigt | |
| 6,340,138 B1 * | 1/2002 | Barsky et al. | 244/165 |
| 6,393,830 B1 | 5/2002 | Hamke et al. | |
| 6,598,385 B1 | 7/2003 | Abel et al. | |
| 7,716,912 B2 * | 5/2010 | Cover et al. | 60/228 |
| 8,244,417 B2 * | 8/2012 | Chilan | 701/13 |
| 8,528,316 B2 * | 9/2013 | Baker et al. | 60/204 |
| 8,735,788 B2 | 5/2014 | Preston et al. | |
| 2010/0168938 A1 * | 7/2010 | Seo et al. | 701/13 |

OTHER PUBLICATIONS

U.S. Patent Office Action issued Aug. 3, 2015 in related U.S. Appl. No. 14/018,683.

* cited by examiner

Fig. 9

ORBIT ATTITUDE CONTROL DEVICE, AND METHOD OF CONTROLLING ORBIT ATTITUDE

INCORPORATION BY REFERENCE

This application is based upon and claims the benefit of priority from Japanese patent application No. 2012-260142, filed on Nov. 28, 2012, the disclosure of which is incorporated herein in its entirety by reference.

TECHNICAL FIELD

The present invention rerates to a technique for controlling an orbit of a flying object.

BACKGROUND ART

Technologies for controlling an attitude or orbit of a flying object flying through space or the atmosphere have been developed. In a system typically called DACS (Divert and Attitude Control System), an attitude control thruster for controlling an attitude of the flying object and an orbit control thruster for changing an orbit are used for controlling the attitude and orbit.

Patent Literature 1 discloses one example of a thruster control method. The method includes: detecting a pressure of a combustion chamber, comparing the detected pressure with a predetermined pressure value, and changing discharge areas of a plurality of nozzles for substantially same amount so that the pressure of the combustion chamber becomes the predetermined pressure, based on a difference between the detected pressure and the predetermined pressure.

CITATION LIST

[Patent literature 1] U.S. Pat. No. 5,456,425

SUMMARY OF THE INVENTION

A combustion gas is supplied to a plurality of nozzles included in a thruster from a common combustion chamber. The each nozzle includes a valve which is controlled based on a designated opening degree command value. Each nozzle injects the combustion gas with an amount corresponding to the opening degree, and thereby an orbit attitude of the flying object is controlled.

When an opening degree command value for realizing a predetermined course is inputted, in fact, there is a case where a deviation from the course occurs due to various disrupting factors. As such disrupting factors, mechanical accidental errors, thermal expansions of the valve or the like, and ununiformity of a fuel or the like are considered. A technology for controlling the orbit and attitude which is robust against the disturbing factors is desired. Furthermore, it is expected that the pressure of the combustion chamber is controlled to be kept constant in order to maintain stable combustion.

An orbit attitude control device according to the present invention includes a plurality of nozzles configured to inject a combustion gas supplied from a combustion chamber. Opening degrees of the plurality of nozzles are configured to be controlled in accordance with opening degree command values. First group nozzles which belong to a first group of the plurality of nozzles inject the combustion gas in opposite directions along a first axis. The orbit attitude control device further includes: a control section configured to calculate nozzle opening degree correction values that are correction values for opening degree command values of the plurality of nozzles, based on a detection value of a pressure of the combustion chamber and a command value for the pressure, and correct the opening degree command values by the nozzle opening degree correction values; and a first axis acceleration sensor configured to detect a first axis acceleration which is an acceleration along the first axis direction. The nozzle opening degree correction values for the first group nozzles are determined by the first axis acceleration.

A method of controlling an orbit attitude according to the present invention includes: controlling each of opening degrees of a plurality of nozzles which inject combustion gas supplied from a combustion chamber, in accordance with opening degree command values. First group nozzles which belong to a first group of the plurality of nozzles inject combustion gas in opposite directions along a first axis. The method further includes: calculating nozzle opening degree correction values that are correction values for opening degree command values of the plurality of nozzles in accordance with a detection value of a pressure of the combustion chamber and a command value for the pressure to correct the opening degree command values by the nozzle opening degree correction value; and detecting a first axis acceleration which is an acceleration along the first axis direction. The nozzle opening degree correction values for the first group nozzles are determined by the first axis acceleration.

According to the present invention, an orbit attitude control device and a method of controlling an orbit attitude are provided, which realize orbit attitude control that is robust against the disturbing factors. Further, an orbit attitude control device and a method are provided, which are able to keep the pressure of the combustion chamber constant.

BRIEF DESCRIPTION OF DRAWINGS

FIG. 9 is a diagram for explaining an operation of a control section.

DESCRIPTION OF EMBODIMENTS

Configuration of a Thruster

Figure 1A:
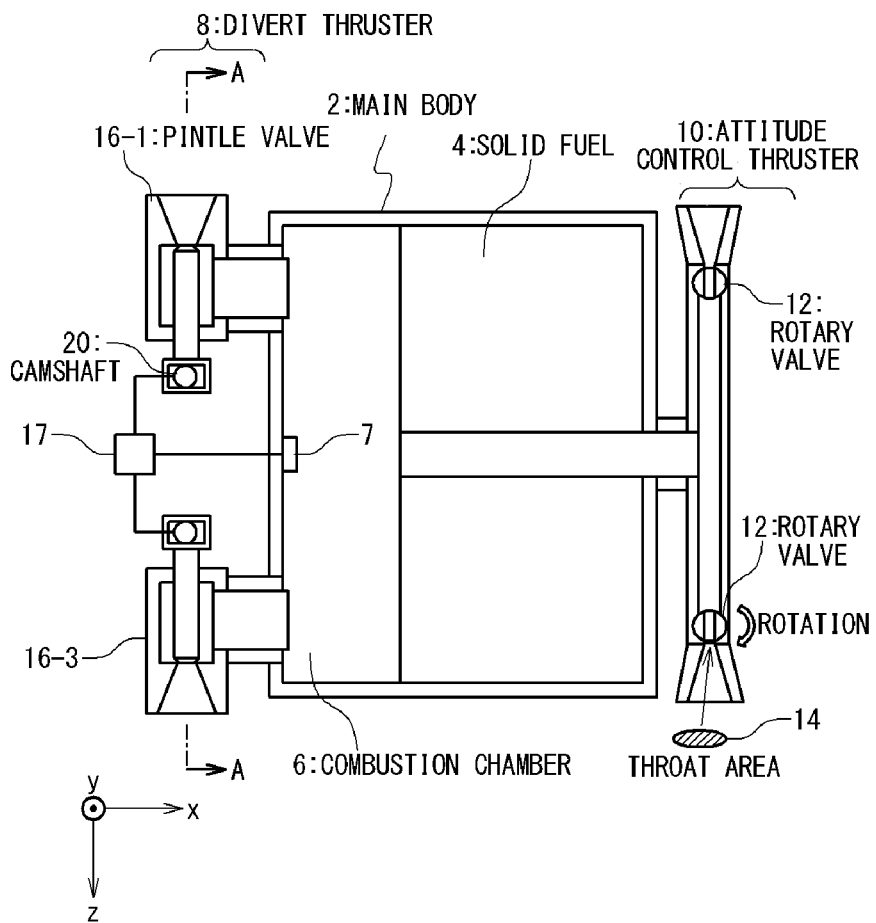
FIG. 1A is a sectional view showing an attitude control device.
Figure 2A:
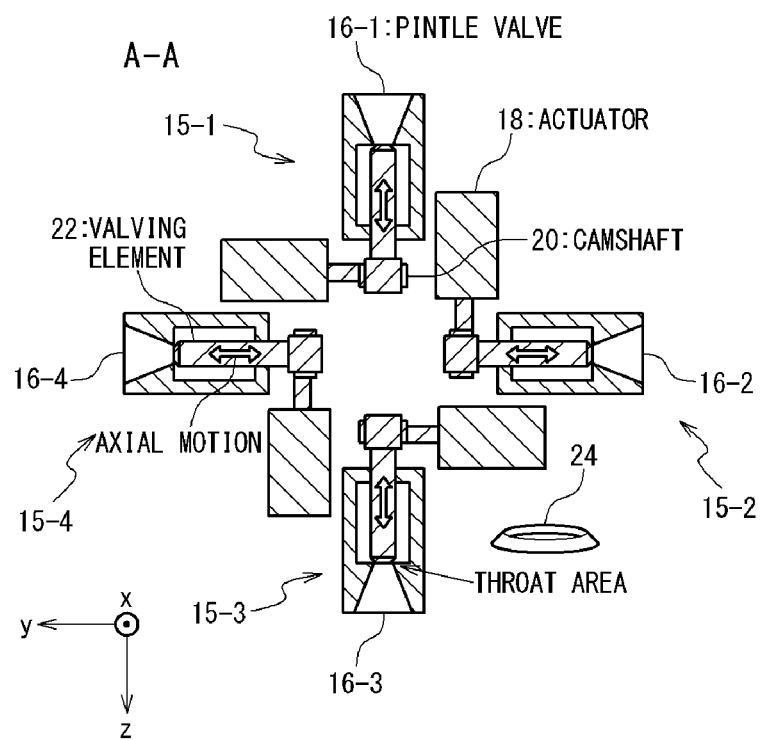
FIG. 2A is a sectional view showing a divert thruster.

With reference to the drawings, embodiments will be described. FIG. 1A is a cross-sectional view showing an attitude control device according to the present embodiment. A flying object including this attitude control device has an outer shape which is almost symmetrical to the x-axis illustrated in the drawing, and is propelled roughly along the x-axis direction. FIG. 2A is a sectional view showing A-A cross-section of a divert thruster 8 of FIG. 1A.

Figure 1B:
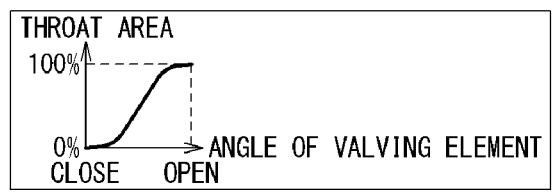
FIG. 1B is a graph indicating a relationship between an angle of a valving element and a throat area.

A solid fuel 4 is arranged inside a main body 2 of the attitude control device. When the flying object flies, the solid fuel 4 combusts and a combustion chamber 6 of the main body 2 is filled with combustion gas. An internal pressure of the combustion chamber 6 is detected by a combustion pressure sensor 7. A relatively small part of the combustion gas is supplied to an attitude control thruster 10. The attitude control thruster 10 includes a plurality of nozzles which face to a radial direction of a cylindrical coordinate system whose center is the x-axis (a direction in YZ-plane whose start point is arranged on the x-axis in FIG. 1A). Each of the plurality of nozzles includes a rotary valve 12. An opening degree of the rotary valve 12 is controlled by an electrical signal. The combustion gas supplied to the attitude control thruster 10 is injected from the each nozzle for an amount corresponding to the opening degree of the rotary valve 12, and thereby the attitude of the flying object is controlled. A shape 14 of an opening portion of the rotary valve 12 is indicated in a lower right part of FIG. 1A. FIG. 1B shows a graph indicating a relationship between an angle of a valving element and a throat area of the rotary valve 12.

A relatively large part of the combustion gas of the combustion chamber 6 is supplied to the divert thruster 8. The divert thruster 8 includes a plurality of nozzles 15-1 to 15-4 which face to a radial direction of the cylindrical coordinate system whose center is the x-axis (a direction in YZ-plane whose start point is arranged on the x-axis in FIG. 1A). The plurality of nozzles 15-1 to 15-4 includes pintle valves 16-1 to 16-4, respectively.

Figure 2B:
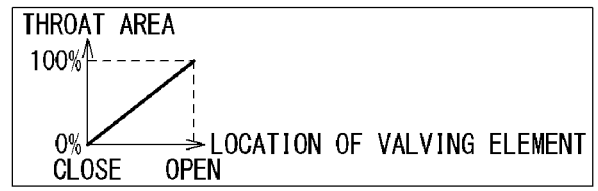
FIG. 2B is a graph indicating a relationship between a location of a valving element and a throat area.

Opening degree command values concerning the pintle valves 16-1 to 16-4 are provided, based on a wireless communication with an outside of the flying object or data stored in a storage device included in the flying object. A control section 17 controls actuators 18, based on the opening degree command values and a detection value of a pressure of the combustion chamber 6 which is detected by the combustion pressure sensor 7. The actuators 18 control opening degrees of the pintle valves 16-1 to 16-4. The combustion gas supplied to the divert thruster 8 is injected from the each of the nozzles 15-1 to 15-4 for an amount corresponding to the opening degrees of the pintle valves 16-1 to 16-4, and thereby the attitude of the flying object is controlled. A shape of an opening portion of the each of pintle valves 16-1 to 16-4 is indicated in a lower right part of FIG. 2A. FIG. 2B shows a graph indicating a relationship between a location of a valving element and a throat area of the each of pintle valves 16-1 to 16-4.

Figure 3:
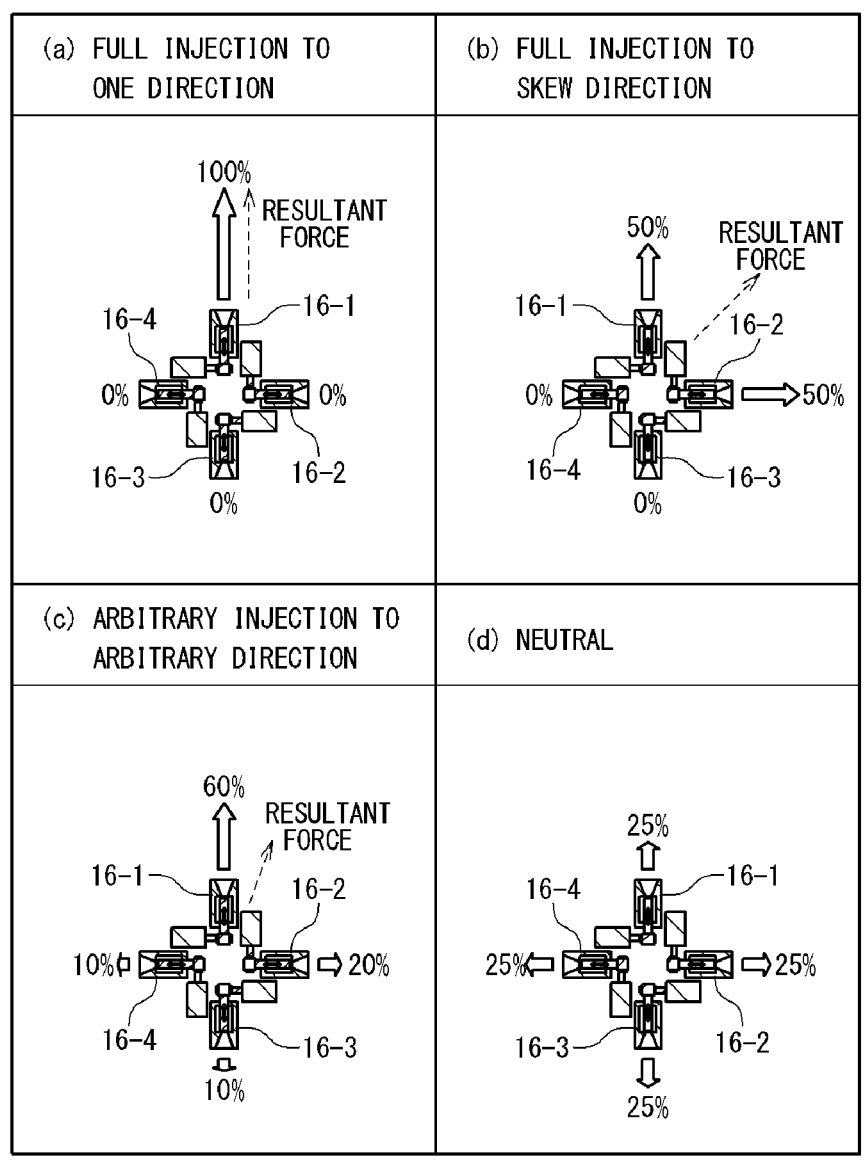
FIG. 3 is a diagram for explaining distribution of opening degrees in the divert thruster.

With reference to FIG. 3, a method of distributing opening degrees of the divert thruster 8 will be explained, which is a basis of the present embodiment. When the solid fuel 4 stably combusts, a generation amount of the generated combustion gas in a unit of time is substantially constant. Accordingly, a flow rate of the combustion gas supplied to the outside from the combustion chamber 6 is desirably kept constant. In particular, it is desired that a flow rate of the combustion gas injected from the divert thruster 8 whose injection amount is large is kept constant. Therefore, the opening degree of the each pintle valve is controlled so that a total of throat areas of the pintle valves 16-1 to 16-4 included in the divert thruster 8 is a constant (this constant value is assumed to be 100%). The combustion pressure of the combustion chamber 6 is kept constant by such control, and a transitive fluctuation of the combustion pressure is suppressed.

FIG. 3($a$) to ($d$) shows four pintle valves 16-1 to 16-4, respective percentages of throat areas, and a resultant force of injections from the pintle valves 16-1 to 16-4. As shown in FIG. 3($a$), when the opening degree of the pintle valve 16-1 is 100% and the pintle valves 16-2 to 16-4 are fully closed, the resultant force acts along an upper direction in the drawing (the negative direction along the z-axis) and the orbit of the flying object is changed to be a direction opposite to the resultant force. As shown in FIG. 3($b$), when the opening degree of the each of pintle valves 16-1 and 16-2 is 50% and the pintle valves 16-3 and 16-4 are fully closed, the resultant force acts along an upper right direction and the orbit of the flying object is changed to be a direction opposite to the resultant force. When the resultant force by the injection of the divert thruster is required to be reduced, as shown in FIG. 3($c$), a pintle valve facing to one direction and a pintle valve facing to the opposite direction are simultaneously opened. For example, in FIG. 3($c$), the pintle valve 16-3 facing to the positive direction along the z-axis is opened with opening degree of 10%, and the pintle valve 16-1 facing to the negative direction along the z-axis is opened with opening degree of 60%. As a result, a force is obtained, which is equal to the resultant force that is obtained when the pintle valve facing to the negative direction along the z-axis is opened with opening degree of 50%. If the orbit is not to be changed by the divert thruster 8, as shown in FIG. 3($d$), in the pintle valves 16-1 to 16-4, the pintle valves facing to each other are set to be same opening degree.

[Control 1 in a Case where a Total Opening Degree Command Value is Changed for Responding to a Change in Pressure]

When the pintle valves 16-1 to 16-4 are controlled by a fixed total opening degree command value, the combustion pressure of the combustion chamber 6 does not necessarily become constant, because of disturbing factors such as mechanical errors, thermal expansions of valves or the like, and ununiformity of the fuel and so on. Accordingly, feed back control for total opening degree of the divert thruster 8 is carried out by using the detection value of the combustion pressure sensor 7, so that the pressure of the combustion chamber 6 becomes constant.

Figure 4A:
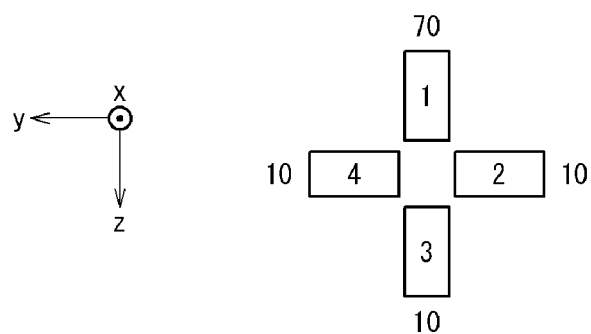
FIG. 4A is a diagram showing a distribution of opening degrees to pintle valves when a total opening degree command value is changed in the divert thruster.
Figure 4B:
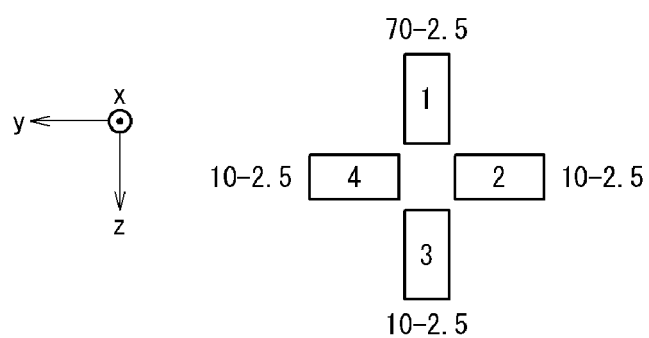
FIG. 4B is a diagram showing a distribution of opening degrees to pintle valves when a total opening degree command value is changed in the divert thruster.

FIGS. 4A and 4B show an example of control in a case where the detection value of the pressure of the combustion chamber 6 is smaller than a set value and the total opening degree of the divert thruster 8 is controlled to be reduced. By reducing the total opening degree, an amount of the injected combustion gas is reduced, and the pressure of the combustion chamber 6 is increased.

FIG. 4A indicates a case where the total opening degree command value of the divert thruster 8 is 100%, 70% of it is distributed to the pintle valve 16-1, and 10% of it is distributed to each of the pintle valves 16-2 to 16-4. At this state, it is assumed that the detection value of the pressure of the combustion chamber 6 is smaller than the set value and the total opening degree command value is changed to be 90% by addition of a total correction value of −10%. In this example, the total correction value is evenly distributed to all pintle values 16-1 to 16-4. As shown in FIG. 4B, by evenly distributing the total correction value of −10% to the all pintle valves 16-1 to 16-4, the pressure of the combustion chamber 6 can be increased, keeping the direction of the resultant force the same.

On the contrary, when the detection value of the pressure of the combustion chamber 6 is larger than the set value and the total opening degree of the divert thruster 8 is controlled to be increased, the amount of the injected combustion gas is increased and the pressure of the combustion chamber 6 is decreased, by addition of a positive total correction value (by increasing the total opening degree). In this case, by changing a symbol of the correction value for the opening degree of the pintle valve to be opposite (−2.5% in FIG. 4B), the pressure of the combustion chamber can be controlled to be kept constant.

[Control 2 in a Case where a Total Opening Degree Command Value is Changed for Responding to a Change in Pressure]

Figure 5A:
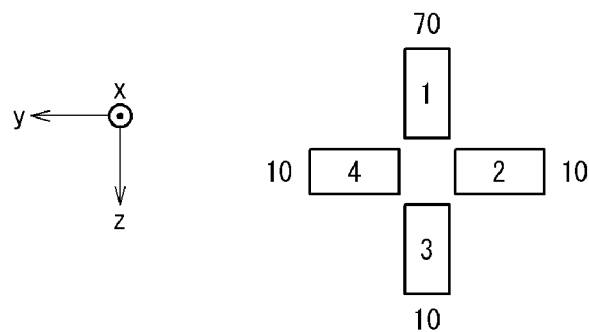
FIG. 5A is a diagram showing a distribution of opening degrees to pintle valves when a total opening degree command value is changed in the divert thruster.
Figure 5B:
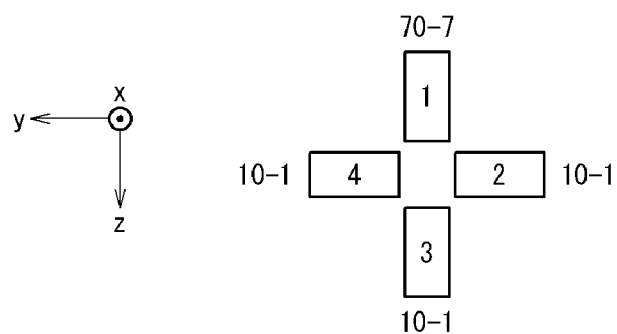
FIG. 5B is a diagram showing a distribution of opening degrees to pintle valves when a total opening degree command value is changed in the divert thruster.

FIGS. 5A and 5B show another example of control in a case where the detection value of the pressure of the combustion chamber 6 is smaller than the set value and the total opening degree of the divert thruster 8 is controlled to be reduced. FIG. 5A shows a case where the total opening degree command value of the divert thruster 8 is 100%, 70% of it is distributed to the pintle valve 16-1, and 10% of it is distributed to each of the pintle valves 16-2 to 16-4. At this state, a case is shown in FIG. 5B where the detection value of the pressure of the combustion chamber 6 becomes smaller than the set value and the total opening degree command value is changed to be 90%.

In this example, the total correction value for the opening degree command value is distributed in proportion to the each of the opening degree command values of the pintle valves 16-1 to 16-4 which are prior to correction. In an example shown in FIG. 5A, the opening degree command values of the pintle valves 16-1 to 16-4 are 70:10:10:10. Accordingly, if the total correction value is −10%, as shown in FIG. 5B, the correction values are distributed to the each of pintle valves 16-1 to 16-4 with a ratio of −7%:−1%:−1%:−1%.

Such control provides following advantages. As disturbing factors of the control, fluctuation of an injection amount of the divert thruster 8 due to a thermal expansion is considered. It is assumed that influences by the thermal expansion are approximately same as uniform expansions of parts arranged near the pintle valve 16. In this case, when the opening degree of the pintle valve 16 is large, an increased amount of the throat area by the thermal expansion becomes large, and accordingly, an increased amount of the injection amount by the thermal expansion becomes large.

In order to adequately suppress the increase in the injection amount, it is considered to be appropriate that the total correction value for the opening degree command values is largely distributed to a pintle valve having a large opening degree. In an example shown in FIG. 5B, the total correction value is distributed in proportion to the each opening degree command value of the each pintle valve, and thereby desirable control can be realized, that is, the opening degree of the largely thermally-expanded valve is largely corrected.

Figure 6:
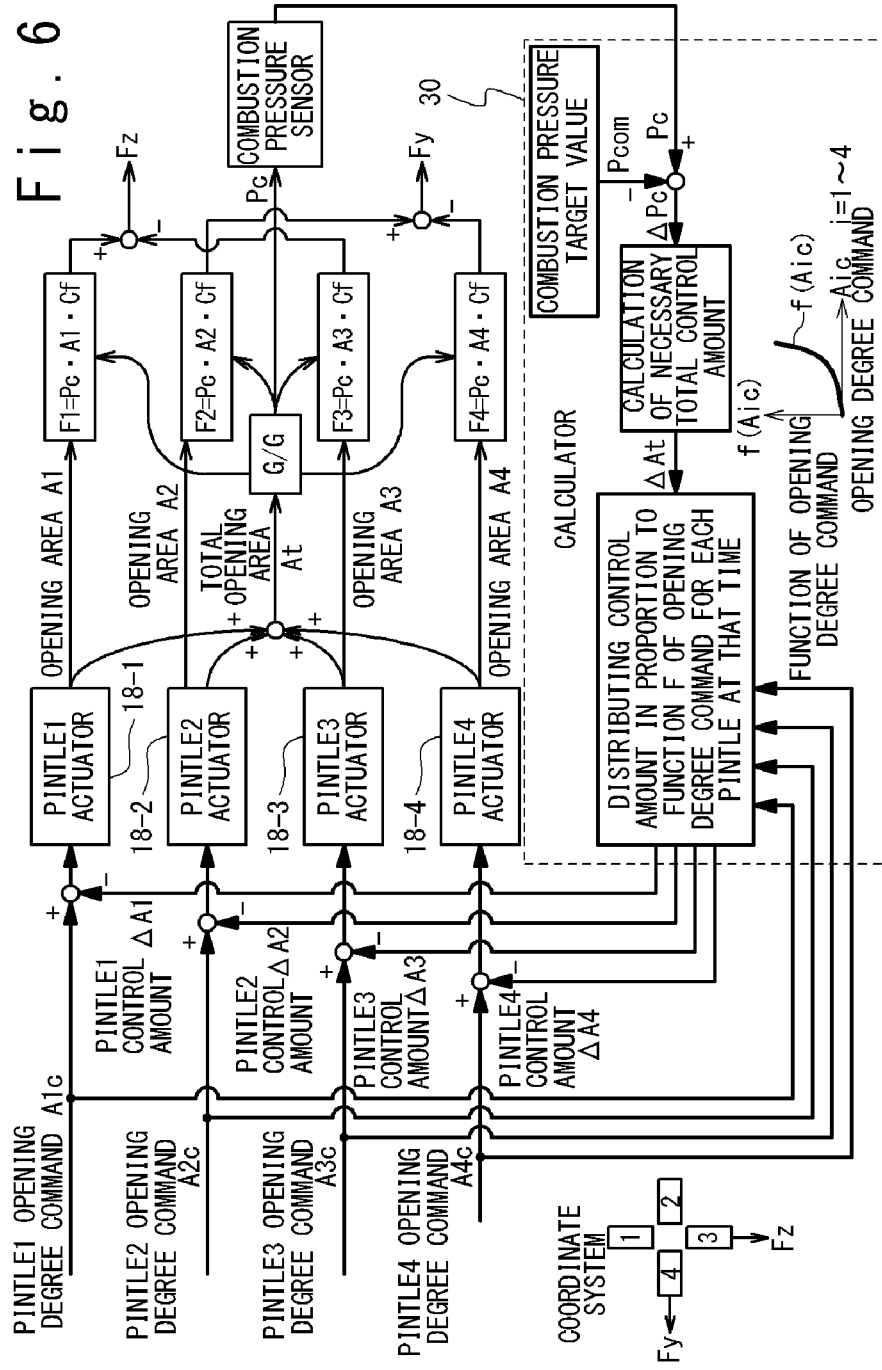
FIG. 6 is a diagram for explaining an operation of a control section.

FIG. 6 shows a configuration of a control section 17 for realizing the above mentioned control. Opening degree commands A1c to A4c for the pintle valves 16-1 to 16-4 are inputted into the control section 17, based on a wireless communication or data stored in a storage section. These values are corrected by correction values ΔA1 to ΔA4 for the opening degree commands of the pintle valves 16-1 to 16-4, respectively. The control section 17 outputs the corrected opening degree commands to respective actuators 18-1 to 18-4 of the pintle valves 16-1 to 16-4. The actuators 18-1 to 18-4 drive, opening areas of the pintle valves 16-1 to 16-4 are respectively set to be A1 to A4, and a total opening area At is determined. Following thrust forces are obtained by injection from each of the nozzles 15-1 to 15-4.

$$F1 = Pc \cdot A1 \cdot Cf$$

$$F2 = Pc \cdot A2 \cdot Cf$$

$$F3 = Pc \cdot A3 \cdot Cf$$

$$F4 = Pc \cdot A4 \cdot Cf$$

The Pc indicates the pressure of the combustion chamber 6, and Cf indicates a thrust coefficient. A thrust force Fz along the z-axis direction is determined by a difference between F1 and F3. A thrust force Fy along the y-axis direction is determined by a difference between F2 and F4.

The Pressure Pc of the combustion chamber 6 is detected by the combustion pressure sensor 7. A calculator provided in the control section 17 calculates a total correction value ΔAt that is a correction value for the total opening area At, based on a deviation ΔPc between the detected pressure Pc and a combustion pressure target value Pcom which is provided by data stored in the storage section, in order to carry out feed back control that is typically PID control.

The calculator of the control section 17 distributes the total correction value ΔAt to the correction values ΔA1 to ΔA4 for the pintle valves 16-1 to 16-4. This distribution is carried out, according to the following formulas.

$$\Delta A1 = \Delta At \times f(A1c) / \{f(A1c) + f(A2c) + f(A3c) + f(A4c)\}$$

$$\Delta A2 = \Delta At \times f(A2c) / \{f(A1c) + f(A2c) + f(A3c) + f(A4c)\}$$

$$\Delta A3 = \Delta At \times f(A3c) / \{f(A1c) + f(A2c) + f(A3c) + f(A4c)\}$$

$$\Delta A4 = \Delta At \times f(A4c) / \{f(A1c) + f(A2c) + f(A3c) + f(A4c)\}$$

The f (opening degree command) is a monotonically increasing function of the opening degree command, as indicated at a lower part of FIG. 6. Especially, if the f (opening degree command) is a proportional function, the control explained by FIGS. 5A and 5B is realized. Since these correction values are used as correction values for the opening degree commands A1c to A4c of the pintle valves 16-1 to 16-4, a larger correction amount is provided in a valve having a larger opening degree, and control can be realized to keep the pressure of the combustion chamber 6 constant.

[Control 3 in a Case where a Total Opening Degree Command Value is Changed for Responding to a Change in Pressure]

Figure 7A:
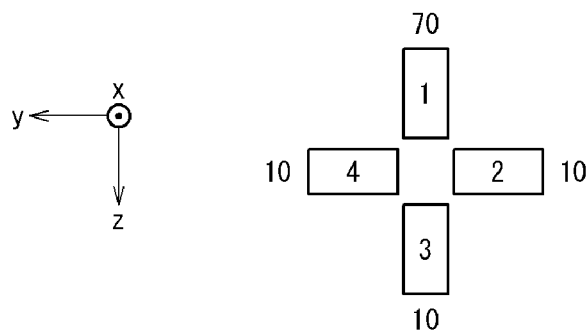
FIG. 7A is a diagram showing a distribution of opening degrees to pintle valves when a total opening degree command value is changed in the divert thruster.
Figure 7B:
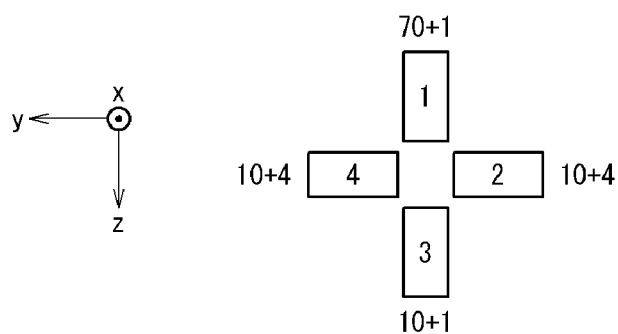
FIG. 7B is a diagram showing a distribution of opening degrees to pintle valves when a total opening degree command value is changed in the divert thruster.

FIGS. 7A and 7B show further another example of control in a case where the detection value of the pressure of the combustion chamber 6 is smaller than the set value and the total opening degree of the divert thruster 8 is controlled to be changed. FIG. 7A shows a case where the total opening degree command value of the divert thruster 8 is 100%, 70% of it is distributed to the pintle valve 16-1, and 10% of it is distributed to each of the pintle valves 16-2 to 16-4. At this state, a case is shown in FIG. 7B where the detection value of the pressure of the combustion chamber 6 becomes larger than the set value and the total opening degree command value is changed to be 110%.

In this example, nozzles facing to opposite directions are referred as a nozzle group. For example, the nozzles 16-1 and 16-3 facing to opposite directions are referred to as a first nozzle group, and the nozzles 16-2 and 16-4 facing to opposite directions are referred to as a second nozzle group. In the same nozzle group, the opening degree correction value is distributed to the nozzles with a same ratio.

In FIG. 7A, a total value T1 of the opening degree command values for the first nozzle group is "70+10=80%", and a total value T2 of the opening degree command values for the second nozzle group is "10+10=20%". In this case, the total correction value "10%" is distributed to the first nozzle group with a ratio of T2/(T1+T2), and to the second nozzle group with a ratio of T1/(T1+T2). Accordingly, in the example shown in FIG. 7A, the total correction value is distributed to the first nozzle group by 2%, and to the second nozzle group by 8%. The correction value is evenly distributed into the nozzles of the first group 16-1, 16-3, the correction value is evenly distributed into the nozzles of the second group 16-2, 16-4, and thereby, the correction values shown in FIG. 7B are obtained.

According to such control, when the combustion pressure becomes larger than the set value, the total correction value for the combustion gas is evenly distributed in opposite directions without changing the orbit. Moreover, the total correction value is largely distributed to a nozzle group having small opening degree command values. Accordingly, the opening degrees of the pintle valves 16-1 to 16-4 after the correction are more even than those before the correction. The plurality of nozzles 15-1 to 15-4 of the divert thruster 8 are desirably used evenly rather than used disproportionately. According to control shown in FIGS. 7A and 7B, such more evenly-used control can be attained.

Figure 8:
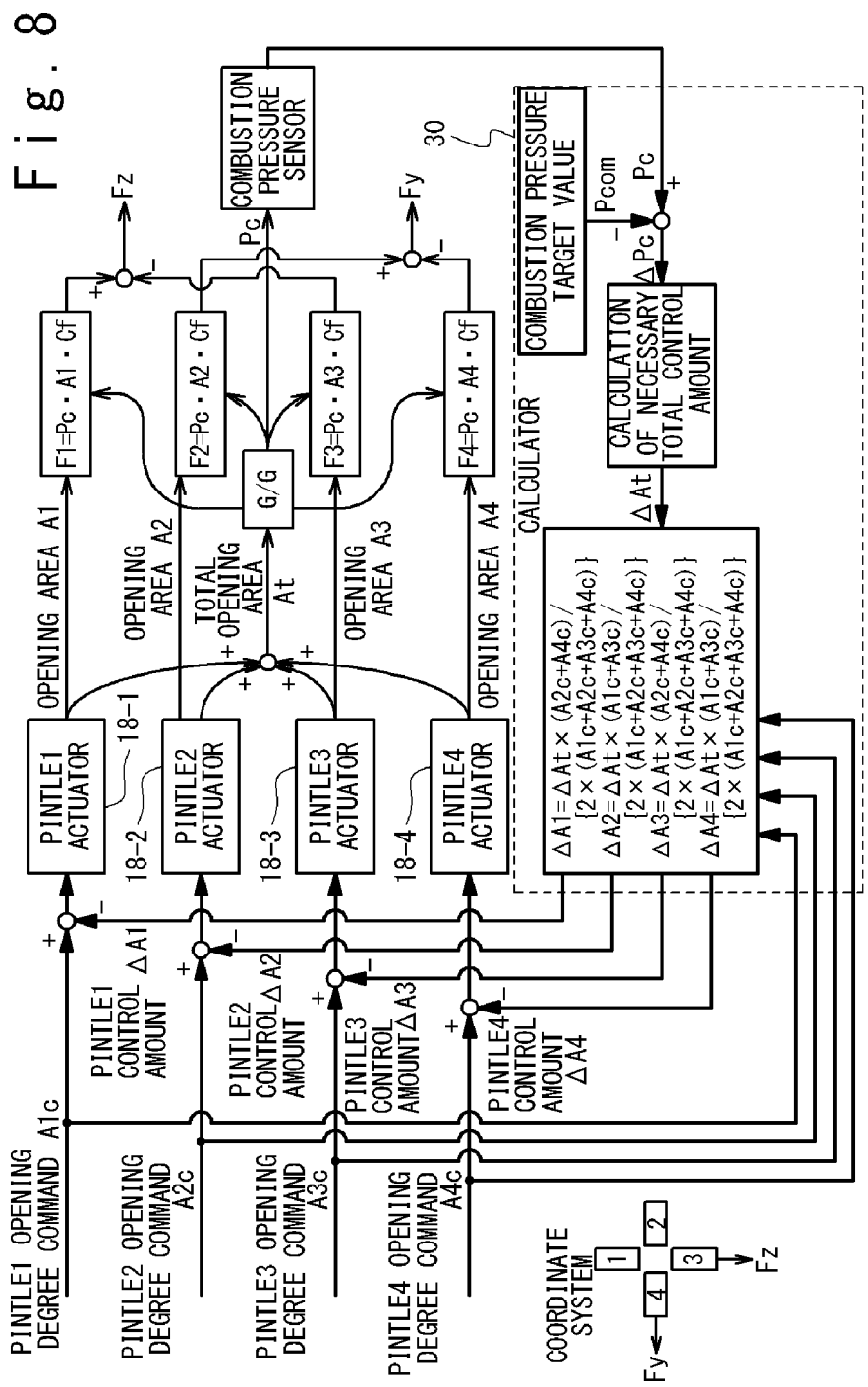
FIG. 8 is a diagram for explaining an operation of a control section.

FIG. 8 shows a configuration of a control section 17 for realizing the above mentioned control. Opening degree commands A1c to A4c for the pintle valves 16-1 to 16-4 are inputted into the control section 17, based on a wireless communication or data stored in a storage section. These values are corrected by correction values $\Delta A1$ to $\Delta A4$ for the opening degree commands of the pintle valves 16-1 to 16-4, respectively. The control section 17 outputs the corrected opening degree commands to respective actuators 18-1 to 18-4 of the pintle valves 16-1 to 16-4. The actuators 18-1 to 18-4 drive, opening areas of the pintle valves 16-1 to 16-4 are respectively set to be A1 to A4, and a total opening area At is determined. Following thrust forces are obtained by injection from each of the nozzles 15-1 to 15-4.

$$F1 = Pc \cdot A1 \cdot Cf$$

$$F2 = Pc \cdot A2 \cdot Cf$$

$$F3 = Pc \cdot A3 \cdot Cf$$

$$F4 = Pc \cdot A4 \cdot Cf$$

The Pc indicates the pressure of the combustion chamber 6, and Cf indicates a thrust coefficient. A thrust force along the z-axis direction is determined by a difference between F1 and F3. A thrust force along the y-axis direction is determined by a difference between F2 and F4.

The Pressure Pc of the combustion chamber 6 is detected by the combustion pressure sensor 7. A calculator provided in the control section 17 calculates a total correction value $\Delta At$ that is a correction value for the total opening area At, based on a deviation $\Delta Pc$ between the detected pressure Pc and a combustion pressure target value Pcom, which is provided based on data stored in the storage section, in order to carry out the feed back control that is typically the PID control.

The calculator of the control section 17 distributes the total correction value $\Delta At$ to the correction values $\Delta A1$ to $\Delta A4$ for the pintle valves 16-1 to 16-4. This distribution is carried out by the following formulas.

$$\Delta A1 = \Delta At \times (A2c + A4c) / \{2 \times (A1c + A2c + A3c + A4c)\}$$

$$\Delta A2 = \Delta At \times (A1c + A3c) / \{2 \times (A1c + A2c + A3c + A4c)\}$$

$$\Delta A3 = \Delta At \times (A2c + A4c) / \{2 \times (A1c + A2c + A3c + A4c)\}$$

$$\Delta A4 = \Delta At \times (A1c + A3c) / \{2 \times (A1c + A2c + A3c + A4c)\}$$

By using these correction values as the correction values for the opening degree commands A1c to A4c for the pintle valves 16-1 to 16-4, the total opening degree correction value is largely distributed into a nozzle group having small opening degree command values, and the pressure of the combustion chamber 6 is kept constant.

[Control of Correcting the Opening Degree by a Measurement Value of Acceleration]

Figure 9:
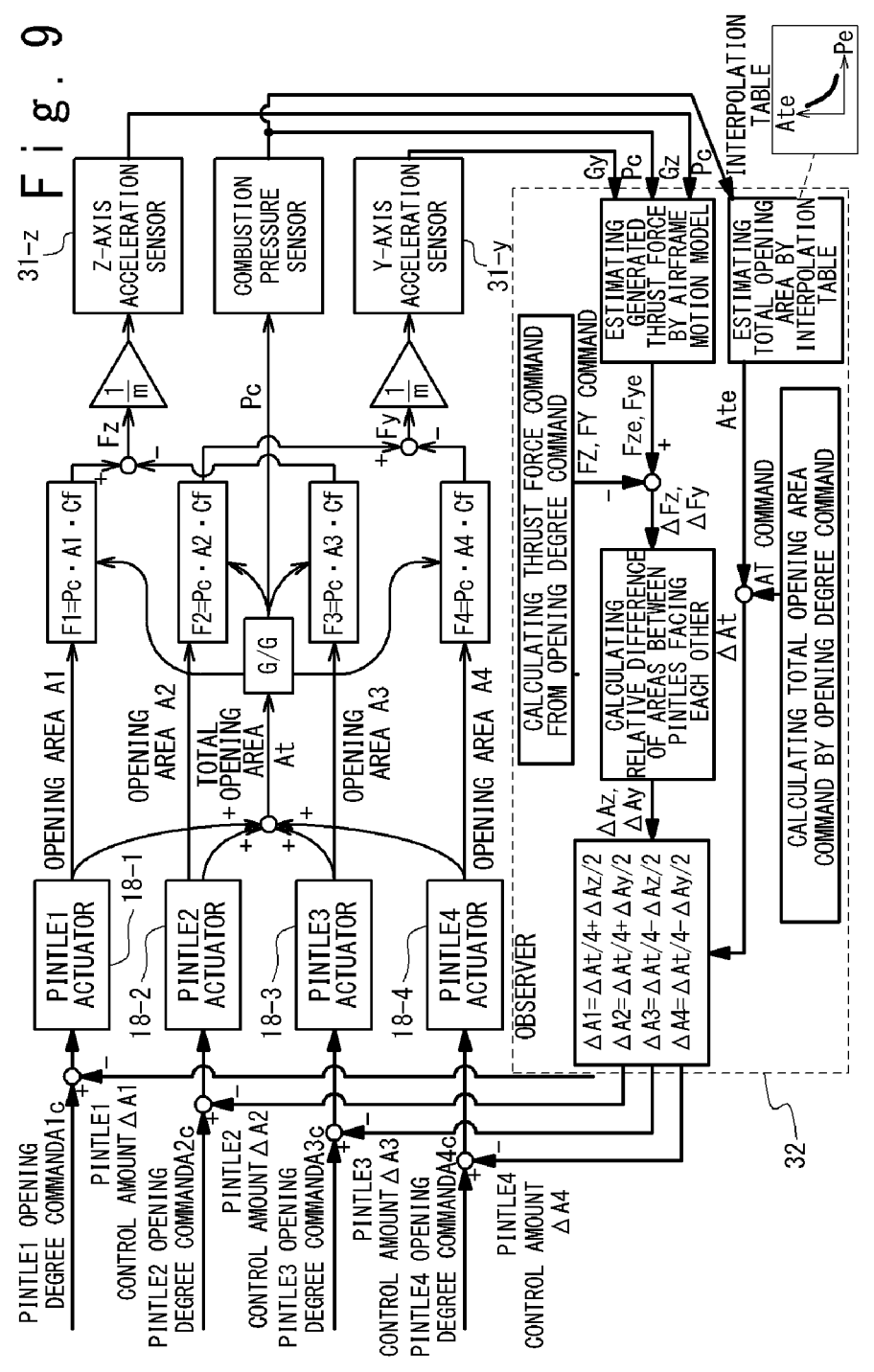

As mentioned above, the example was explained in a case where the divert thruster is controlled in response to a change of the pressure in the combustion chamber. On the other hand, in order that the flying object accurately flies along an orbit according to commands, feed back control using a measurement value of acceleration of the flying object is desired. FIG. 9 shows an example of such control.

With respect to fluctuation of the detection value Pc of the pressure, control is carried out which is similar to the above mentioned [Control 1 in a case where a total opening degree command value is changed for responding to a change in pressure]. This control is indicated by the first term $\Delta At/4$ of each of formulas $\Delta A1$ to $\Delta A4$ shown in lower part of FIG. 9. With respect to the fluctuation of the detection value of the pressure, by changing the first term, the control explained in [Control 2 in a case where a total opening degree command value is changed for responding to a change in pressure] or the control explained in [Control 3 in a case where a total opening degree command value is changed for responding to a change in pressure] can be employed.

Next, control for the divert thruster 8 with an acceleration sensor will be explained. The orbit attitude control device includes an acceleration sensor section. The acceleration sensor section includes a y-axis acceleration sensor for measuring acceleration in the y-axis direction of the coordinate axes illustrated in FIG. 1A and FIG. 2A, and a z-axis acceleration sensor for measuring acceleration in the z-axis direction.

Respective opening degree commands A1c to A4c for each of the pintle valves 16-1 to 16-4 are inputted into the control section 17, by a wireless communication or data stored in a storage section. These values are corrected by correction values $\Delta A1$ to $\Delta A4$ for the opening degree commands of the respective pintle values 16-1 to 16-4. The control section 17 outputs the corrected opening degree commands to respective actuators 18-1 to 18-4 of the pintle valves 16-1 to 16-4. Actuators 18-1 to 18-4 drive, the opening areas of the pintle valves 16-1 to 16-4 are respectively set to be A1 to A4, and the total opening area At is determined. The following thrust forces are obtained by the injection from the each of nozzles 15-1 to 15-4.

$$F1 = Pc \cdot A1 \cdot Cf$$

$$F2 = Pc \cdot A2 \cdot Cf$$

$$F3 = Pc \cdot A3 \cdot Cf$$

$$F4 = Pc \cdot A4 \cdot Cf$$

The Pc indicates the pressure of the combustion chamber 6, and Cf indicates the thrust coefficient. A thrust force Fz along the z-axis direction is determined by a difference between F1 and F3. A thrust force Fy along the y-axis direction is determined by a difference between F2 and F4. Accelerations along the y-axis and z-axis are generated in the flying object, by the thrust forces Fy and Fz.

The y-axis acceleration sensor and the z-axis acceleration sensor detect a y-axis acceleration Gy and a z-axis acceleration Gz, respectively. An observer 32 provided in the control section 17 corrects the opening degree command values of the divert thruster based on these accelerations. A storage device in the observer 32 stores an inertia model of the flying object. The observer 32 calculates estimated values of a thrust force Fye along the y-axis direction and a thrust force Fze along the z-axis direction, based on this inertia model, the inputted y-axis acceleration Gy and z-axis acceleration Gz.

The observer 32 transforms the opening degree commands A1c to A4c of the pintle valves into a command values for the thrust forces along the y-axis direction and the z-axis direction, based on a previously prepared formula or a table. Furthermore, the observer 32 calculates deviations ΔFy, ΔFz between these command values for the thrust forces and estimated values Fye, Fze for the thrust forces. A correction value ΔAz of a relative difference between the opening degrees of pintle valves 16-1 and 16-3 of the first group is calculated so that the deviation ΔFz becomes smaller. A correction value ΔAy of a relative difference between the opening degrees of pintle valves 16-2 and 16-4 of the second group is calculated so that the deviation ΔFy becomes smaller.

For example, according to the following formulas, the opening degree correction values ΔA1 to ΔA4 of the pintle valves are determined, by using the correction values ΔAy and ΔAz which are relative differences between opening degrees and are calculated for each group of pintle valves facing each other, and a total correction value ΔAt for keeping the pressure of the combustion chamber constant.

$$\Delta A1 = \Delta At/4 + \Delta Az/2$$

$$\Delta A2 = \Delta At/4 + \Delta Ay/2$$

$$\Delta A3 = \Delta At/4 - \Delta Az/2$$

$$\Delta A4 = \Delta At/4 - \Delta Ay/2$$

In this example, ΔAy and ΔAz are evenly distributed to the pintle valves facing each other, respectively. ΔAt is evenly distributed to all pintle valves. With respect to ΔAt, correction corresponding to FIG. 6 or FIG. 8 may be employed.

The orbit of the flying object can be accurately controlled, by the feed back control of the detection value of the acceleration about the injection direction of the divert thruster. Moreover, control for keeping the combustion pressure constant can be realized.

Although the present invention has described above in connection with several embodiments thereof, it would be apparent to those skilled in the art that those embodiments are provided solely for illustrating the present invention, and should not be relied upon to construe the appended claims in a limiting sense.

What is claimed is:

1. An orbit attitude control device, comprising:
a pressure sensor configured to detect a pressure of a combustion chamber to generate a pressure detection value;
a first axis acceleration sensor configured to detect an acceleration in a first axis direction as a first axis acceleration;
a second axis acceleration sensor configured to detect an acceleration in a second axis direction as a second axis acceleration;
a plurality of nozzles respectively having a plurality of valves and configured to emit combustion gas generated in said combustion chamber through said plurality of valves, whose opening degrees are controlled based on valve opening degree control values, and wherein said plurality of nozzles comprises a first couple of nozzles respectively having a first couple of valves and emitting the combustion gas in opposite directions along a first axis and a second couple of nozzles respectively having a second couple of valves and emitting the combustion gas in opposite directions along a second axis;
a storage section configured to store an inertia model of an object whose orbit is controlled by said first couple of nozzles and said second couple of nozzles; and
a control section configured to:
calculate a relative thrust force of said first couple of nozzles along the first axis direction as an estimated first axis thrust force value and a relative thrust force of said second couple of nozzles along the second axis direction as an estimated second axis thrust force value, based on the inertia model, the pressure detection value, the first axis acceleration, and the second axis acceleration;
convert valve opening degree command values for said first couple of valves into a first axis thrust force command value and valve opening degree command values for said second couple of nozzles into a second axis thrust force command value,
calculate a first axis thrust force difference indicating a difference between the estimated first axis thrust force value and the first axis thrust force command value, and a second axis thrust force difference indicating a difference between the estimated second axis thrust force value and the second axis thrust force command value,
calculate a first axis valve opening degree difference for said first couple of valves based on the first axis thrust force difference, and a second axis valve opening degree difference for said second couple of valves based on the second axis thrust force difference,
estimate a total valve opening degree value of said valves of said first and second couples of valves based on the pressure detection value,
calculate the valve opening degree correction values which are correction values of the valve degree command values for said first and second couples of valves, based on the estimated total valve opening degree value, the first axis valve opening degree difference and the second axis valve opening degree difference,
wherein the valve opening degree correction values comprise pressure dependent correction values which are calculated based on the estimated total valve opening degree value, and acceleration dependent correction values which are calculated based on the first axis valve opening degree difference and the second axis valve opening degree difference,
calculate the valve opening degree control values from the valve opening degree command values and the valve opening degree correction values, and
output the valve opening degree control values to said first and second couples of valves to drive said valves of said first and second couples of valves based on the valve opening degree control values such that the combustion gas is emitted through said first and second couples of valves.

2. The orbit attitude control device according to claim 1, wherein a summation of the first axis thrust force values for said first couple of nozzles is zero.

3. The orbit attitude control device according to claim 1, wherein said control section is configured to calculate a total correction value that is a correction value for a total value of the valve opening degree command values so that a deviation between the total valve opening degree value estimated from the pressure detection value and the total value of the valve opening degree command values becomes smaller, and evenly distribute the total correction value to the pressure dependent correction values for said first and second couples of valves.

4. The orbit attitude control device according to claim 1, wherein said control section is configured to calculate a total correction value that is a correction value for a total value of the valve opening degree command values so that a deviation between the total valve opening degree value estimated from the pressure detection value and the total value of the valve opening degree command values becomes smaller, and distribute the total correction value to the valve opening degree correction values for said plurality of nozzles in correspondence to a ratio of the valve opening degree command values of said plurality of nozzles.

5. The orbit attitude control device according to claim 1, wherein said control section is configured to:
calculate a total correction value that is a correction value for a total value of the valve opening degree command values so that a deviation between the total valve opening degree value estimated from the pressure detection value and the total value of the valve opening degree command values becomes smaller,
calculate a total first couple opening degree value T1 that is a total value of the opening degree command values for said first couple of valves, and calculate a total second couple opening degree value T2 that is a total value of the valve opening degree command values for said second couple of valves,
distribute the total correction value to a first couple opening degree correction value in a ratio of T2/(T1+T2), and to a second couple opening degree correction value in a ratio of T1/(T1+T2).

6. A method of controlling an orbit attitude, comprising:
detecting a pressure of a combustion chamber to generate a pressure detection value;
detecting an acceleration of a first couple of nozzles in a first axis direction of a plurality of nozzles as a first axis acceleration, the first couple of nozzles respectively having a first couple of valves and emitting combustion gas in opposite directions along a first axis;
detecting an acceleration of a second couple of nozzles in a second axis direction of the plurality of nozzles as a second axis acceleration, the second couple of nozzles respectively having a second couple of valves and emitting the combustion gas in opposite directions along a second axis;
calculating a relative thrust force of the first couple of nozzles along the first axis direction as an estimated first axis thrust force value and a relative thrust force of the second couple of nozzles along the second axis direction as an estimated second axis thrust force value, based on an inertia model, the pressure detection value, the first axis acceleration, and the second axis acceleration, the inertia model indicating an object whose orbit is controlled by the first couple of nozzles and the second couple of nozzles;
converting valve opening degree command values for the first couple of valves into a first axis thrust force command value and valve opening degree command values for the second couple of nozzles into a second axis thrust force command value;
calculating a first axis thrust force difference indicating a difference between the estimated first axis thrust force value and the first axis thrust force command value, and a second axis thrust force difference indicating a difference between the estimated second axis thrust force value and the second axis thrust force command value;
calculating a first axis valve opening degree difference for the first couple of valves based on the first axis thrust force difference, and a second axis valve opening degree difference for the second couple of valves based on the second axis thrust force difference;
estimating a total valve opening degree value of the valves of the first and second couples of valves based on the pressure detection value;
calculating the valve opening degree correction values which are correction values of the valve degree command values for the first and second couples of valves, based on the estimated total valve opening degree value, the first axis valve opening degree difference and the second axis valve opening degree difference, wherein the valve opening degree correction values comprise pressure dependent correction values which are calculated based on the estimated total valve opening degree value, and acceleration dependent correction values which are calculated based on the first axis valve opening degree difference and the second axis valve opening degree difference;
calculating the valve opening degree control values from the valve opening degree command values and the valve opening degree correction values; and
outputting the valve opening degree control values to the first and second couples of valves to drive the valves of the first and second couples of valves based on the valve opening degree control values such that the combustion gas is emitted from the first and second couples of nozzles through said first and second couples of valves, whose opening degrees are controlled based on valve opening degree control values.

7. The method according to claim 6, wherein a summation of the first axis thrust force values for the first couple of nozzles is zero.

8. The method according to claim 6, wherein said calculating of the valve opening degree correction values comprises:
calculating a total correction value that is a correction value for a total value of the valve opening degree command values so that a deviation between the total valve opening degree value estimated from the pressure detection value and the total value of the valve opening degree command values becomes smaller; and
evenly distributing the total correction value to the pressure dependent correction values for the first and second couple of valves.

9. The method according to claim 6, wherein said calculating of the valve opening degree correction values comprises:
calculating a total correction value that is a correction value for a total value of the valve opening degree command values so that a deviation between the total valve opening degree value estimated from the pressure detection value and the total value of the valve opening degree command values becomes smaller; and distributing the total correction value to the valve opening degree correction values for the plurality of nozzles in correspondence to a ratio of the valve opening degree command values of the plurality of nozzles.

10. The method according to claim 6, wherein said calculating of the valve opening degree correction values comprises:

calculating a total correction value that is a correction value for a total value of the valve opening degree command values so that a deviation between the total valve opening degree value estimated from the pressure detection value and the total value of the valve opening degree command values becomes smaller;

calculating a total first couple opening degree value T1 that is a total value of the valve opening degree command values for the first couple of valves, and calculating a total second couple opening degree value T2 that is a total value of the valve opening degree command values for the second couple of valves; and distributing the total correction value to a first couple opening degree correction value in a ratio of T2/(T1+T2), and to a second couple opening degree correction value in a ratio of T1/(T1+T2).

* * * * *